United States Patent
Sato et al.

(10) Patent No.: US 7,042,507 B2
(45) Date of Patent: May 9, 2006

(54) DIGITAL CAMERA, PIXEL DATA READ-OUT CONTROL APPARATUS AND METHOD, BLUR-DETECTION APPARATUS AND METHOD

(75) Inventors: Kazuchika Sato, Kobe (JP); Kazuki Akaho, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 754 days.

(21) Appl. No.: 09/892,833

(22) Filed: Jun. 27, 2001

(65) Prior Publication Data

US 2002/0003581 A1    Jan. 10, 2002

(30) Foreign Application Priority Data

Jul. 5, 2000   (JP)  ............................. 2000-204079
Jul. 5, 2000   (JP)  ............................. 2000-204083

(51) Int. Cl.
*H04N 5/222* (2006.01)
(52) U.S. Cl. ................ 348/333.11; 348/308; 348/208.6
(58) Field of Classification Search ................ 348/362, 348/333.01, 291, 304, 253, 333.1, 241, 333.12, 348/208.99, 208.4, 208.12, 208.1, 333.11, 348/208.6, 308
See application file for complete search history.

(56) References Cited

U.S. PATENT DOCUMENTS

| | | | | |
|---|---|---|---|---|
| 4,475,131 A | * | 10/1984 | Nishizawa et al. | 386/117 |
| 4,586,029 A | * | 4/1986 | Tamura et al. | 340/540 |
| 5,053,876 A | * | 10/1991 | Blissett et al. | 348/208.14 |
| 6,002,431 A | * | 12/1999 | Jung et al. | 348/207.99 |
| 6,084,634 A | * | 7/2000 | Inagaki et al. | 348/294 |
| 6,501,503 B1 | * | 12/2002 | Kudo | 348/208.99 |
| 6,784,928 B1 | * | 8/2004 | Sakurai et al. | 348/220.1 |

FOREIGN PATENT DOCUMENTS

| | | |
|---|---|---|
| JP | 05-130489 A | 5/1993 |
| JP | 11-205689 A | 7/1999 |

* cited by examiner

*Primary Examiner*—Ngoc-Yen Vu
*Assistant Examiner*—Gary C. Vieaux
(74) *Attorney, Agent, or Firm*—Sidley Austin LLP

(57) ABSTRACT

A digital camera includes an image pick-up element that can read out pixel data in a nondestructive manner, specifying means for specifying addresses of a plurality of pixels thinned out among all pixels of the image pick-up element, and data read-out means for reading out pixel data of the specified plurality of pixels in a destructive manner before a main exposure and pixel data of the specified plurality of pixels in a nondestructive manner during said main exposure.

12 Claims, 9 Drawing Sheets

DIGITAL CAMERA, PIXEL DATA READ-OUT CONTROL APPARATUS AND METHOD, BLUR-DETECTION APPARATUS AND METHOD

This application claims priority to Japanese Patent Applications Nos. 2000-204079 and 2000-204083 each filed on Jul. 5, 2000, the disclosure of which is incorporated by reference in its entirety.

BACKGROUND OF THE INVENTION

1. Field of the Invention

The present invention relates to a digital camera, a pixel data read-out control apparatus and method, a blur-detection apparatus and method.

2. Description of Related Art

A digital camera that displays a live-view image on a display unit such as an LCD monitor is known. Furthermore, a digital camera equipped with a hand-blur (hereinafter may simply referred to as "blur") compensation function is also known. In order to perform such a live-view display smoothly or to perform a highly precise blur-compensation, it is desirable to update pixel data with a period of, for example, about 1/30 seconds.

However, with the recent increased number of pixels of an image pick-up element, it becomes very difficult to perform the aforementioned processing in such a short time by reading out the pixel data of all of the pixels of the image pick-up element. To cope with the aforementioned drawbacks, there has been proposed to display a live-view image in a state where the number of pixels is reduced substantially or to perform blur-detection processing by using an image pick-up element such as a CMOS sensor that can specify any pixels and read out the image data of the specified pixels and reading out the data of a plurality of specified pixels which are thinned out from all of the pixels (hereinafter, thinned-out pixels) of the image pick-up element.

According to a conventional digital cameras using thinned-out pixel data, as shown in FIG. 10, a live-view display and a blur-detection are performed by reading out the thinned-out pixel data of a plurality of pixels before the main exposure for obtaining the picked-up image. However, a live-view display and a blur-detection will become unavailable when a shutter button is pressed to start the main exposure, and then the live-view and the blur-detection will be resumed to read out the thinned-out pixel data when the main exposure is completed after reading out the pixel data of all of the pixels. In other words, there is such a drawback that a live-view display and/or a blur-detection are not performed during the main exposure.

With regard to a live-view display, Japanese Patent Laid-open Publication No. H11-205689 discloses that a periodical read-out of pixel data is continuously performed to the image pick-up element during the main exposure and the image data is stored in an image holding portion so that the storage time becomes longer than the read-out period. However, in this structure, the pixel data is not updated during the exposure and therefore a real time live-view display is not performed.

On the other hand, in a digital camera equipped with a blur-detection function, it is desirable to read out each pixel data of an image pick-up element at high speed in order to perform a proper blur-detection.

However, in cases where a CCD is used as an image pick-up element, since it is necessary to read out the pixel signal of all of the pixels for every line, there is a limitation in high-speed processing.

For this reason, another proposal has been made. According to the proposal, an image pick-up element such as a CMOS sensor that can perform a nondestructive read-out of data is used and a plurality of small area blocks are specified among all of the pixels of the aforementioned image pick-up element. Then, the data of the pixels contained in the specified block is read out in a nondestructive manner. Then, the obtained image data is utilized for a blur-detection.

For example, Japanese Patent Laid-open Publication No. H5-130489 discloses that in order to increase the speed of block matching processing, an image pick-up element such as a CMOS sensor that can perform a nondestructive read-out is used, the data of the pixels contained in the specified blocks among all of the pixels of the aforementioned image pick-up element is read out in a nondestructive manner, and then the read-out pixel data is transmitted to a block matching portion. By utilizing the nondestructive read-out of the pixel data, a blur-detection can be performed by reading out the pixel data plural times at a high-speed period during the exposure.

According to conventional digital cameras including the aforementioned prior art, high speed processing can be attained by performing the nondestructive read-out of the pixel data contained in the aforementioned specified blocks of small area. However, since a fixed pattern noise (hereinafter referred to as "FPN") cannot be eliminated within the image pick-up element, it is difficult to perform a highly precise blur-detection because of the noise. Furthermore, there also is a problem that the exposure becomes insufficient due to the read-out of the pixel data at a high-speed period during the exposure, resulting in a decreased blur-detection level.

SUMMARY OF THE INVENTION

It is an object of the present invention to provide a digital camera which can perform a live-view display and a blur-detection before a main exposure and also can perform a live-view display and a blur-detection even during the main exposure.

It is another object of the present invention to provide a pixel data read-out control apparatus and method which can perform a live-view display and a blur-detection before a main exposure and also can perform a live-view display and a blur-detection even during the main exposure.

It is still another object of the present invention to provide a digital camera equipped with a blur-detection function that can perform a blur-detection in high speed and can obtain a sufficient blur-detection level.

It is still yet another object of the present invention to provide a blur-detection apparatus and method that can perform a blur-detection in high speed and can obtain a sufficient blur-detection level.

According to a first aspect of the present invention, a digital camera includes an image pick-up element which can read out pixel data in a nondestructive manner, specifying means for specifying addresses of a plurality of pixels thinned out among all pixels of the image pick-up element, and data read-out means for reading out pixel data of the specified plurality of pixels in a destructive manner before a main exposure and pixel data of the specified plurality of pixels in a nondestructive manner during the main exposure.

In this digital camera, addresses of a plurality of pixels thinned out among all of the pixels of the image pick-up element that can read out image data in a nondestructive manner are specified. The plurality of specified pixels whose addresses are read out in a destructive manner before the main exposure and in a nondestructive manner during the main exposure. Thus, the newest pixel data can be used even during the main exposure. Accordingly, it becomes possible to perform a live-view display and a blur-detection.

According to a second aspect of the present invention, a pixel data read-out control apparatus includes specifying means for specifying a plurality of pixels thinned out among all pixels of an image pick-up element which can read out pixel data in a nondestructive manner, and read-out means for reading out pixel data of the specified pixels in a destructive manner before a main exposure and pixel data of the specified pixels in a nondestructive manner during the main exposure.

With this read-out control apparatus, a plurality of pixels thinned out among all pixels of an image pick-up element which can read out pixel data in a nondestructive manner are specified. The specified pixel data are read out in a destructive manner before a main exposure and in a nondestructive manner during the main exposure. Thus, the newest pixel data can be used even during the main exposure. Accordingly, it becomes possible to perform a live-view display and a blur-detection.

According to a third aspect of the present invention, a pixel data read-out control method includes the steps of specifying a plurality of pixels thinned out among all pixels of an image pick-up element which can read out pixel data in a nondestructive manner, and reading out pixel data of the specified pixels in a destructive manner before a main exposure and the pixel data in a nondestructive manner during the main exposure.

With this control method, since the pixel data of the plurality of specified pixels are read out in a destructive manner before the main exposure and in a nondestructive manner during the main exposure, the newest data can be used even during the main exposure, enabling a live-view display and a blur-detection.

According to a fourth aspect of the present invention, a digital camera includes an image pick-up element which can read out pixel data in a nondestructive manner, specifying means for specifying pixels contained in a block of small area among all pixels of the image pick-up element, read-out means for reading out data of pixels contained in the block of small area in the nondestructive manner during the exposure, a memory which stores a fixed pattern noise table concerning the pixels contained in the block, fixed pattern noise elimination means for performing noise cancellation processing to the pixel data of the block obtained by reading out in the nondestructive manner with reference to the fixed pattern noise table, an adder which adds pixel data from which the fixed pattern noise is eliminated to the pixels contained in the block; and a detector which detects a blur using the added pixel data.

With this digital camera, pixel data contained in the block of small area among all of the pixels of the image pickup element are specified by the specifying means. The data of pixels contained in the block of small area is read out in a nondestructive manner during the exposure. Furthermore, the read-out pixel data are subjected to the noise cancellation processing by the fixed pattern noise elimination means. The pixel data in the block from which noise is eliminated are added by the adder, and a blur is further detected by the detector.

Thus, since the pixel data contained in the block of small area among all of the pixels of the image pick-up element are read out in a nondestructive manner during the exposure, it becomes possible to attain a high speed blur-detection processing. Furthermore, since noise cancellation processing is performed, it becomes possible to attain a highly precise blur-detection. Furthermore, since a plurality of pixel data that the noise cancellation is performed are added in the block, data having a sufficient blur-detection level that the underexposure or the like is corrected can be secured as the whole block.

According to a fifth aspect of the present invention, a blur-detection apparatus includes read-out means for reading out data of pixels in a nondestructive manner during an exposure, the pixels being contained in a block of small area among all pixels of an image pick-up element which can read out pixel data in a nondestructive manner, fixed pattern noise elimination means for performing noise cancellation processing to pixel data of the block obtained by reading out in a nondestructive manner with reference to a table of a fixed pattern noise corresponding to pixels contained in the block, an adder which adds pixel data from which the fixed pattern noise is eliminated to the pixels contained in the block, and a detector for detecting a blur by using the added pixel data.

With this blur-detection apparatus, since data of pixels contained in a block of small area among all pixels of an image pick-up element are read in a nondestructive manner during an exposure, it becomes possible to attain a high speed blur-detection processing. Furthermore, since the noise cancellation processing is performed, it becomes possible to attain a highly precise blur-detection. In addition, since a plurality of pixel data that the noise cancellation is performed are added in the block, data having a sufficient blur-detection level that the underexposure or the like is corrected can be secured as the whole block.

According to a sixth aspect of the present invention, a blur-detection method includes a step for reading out data of pixels in a nondestructive manner during an exposure, the pixels being contained in a block of small area among all pixels of an image pick-up element which can read out pixel data in a nondestructive manner, a step for performing noise cancellation processing to pixel data of the block obtained by reading out in a nondestructive manner with reference to a table of a fixed pattern noise corresponding to pixels contained in the block, a step for adding pixel data from which the fixed pattern noise is eliminated to the pixels contained in the block, and a step for detecting a blur by using the added pixel data.

In this blur-detection method, since the pixel data contained in the specified clock of small area among all of the pixels of the image pick-up element are read out in a nondestructive manner during an exposure, it becomes possible to attain high speed processing of a blur-detection. Furthermore, since noise cancellation processing is performed, it becomes possible to attain a highly precise blur-detection. Furthermore, since a plurality of pixel data that the noise cancellation is performed are added in the block, data having a sufficient blur-detection level that the underexposure or the like is corrected can be secured as the whole block.

Other objects and the features will be apparent from the following detailed description of the present invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Figure 1:
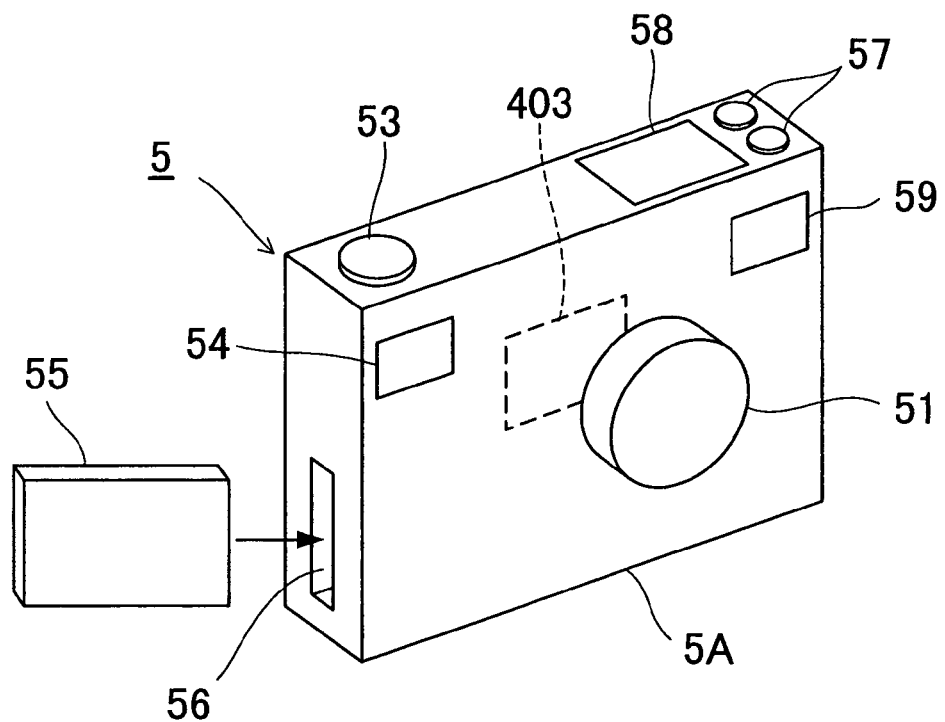
FIG. 1 is a perspective view showing a digital camera according to a first embodiment of the present invention.
Figure 2:
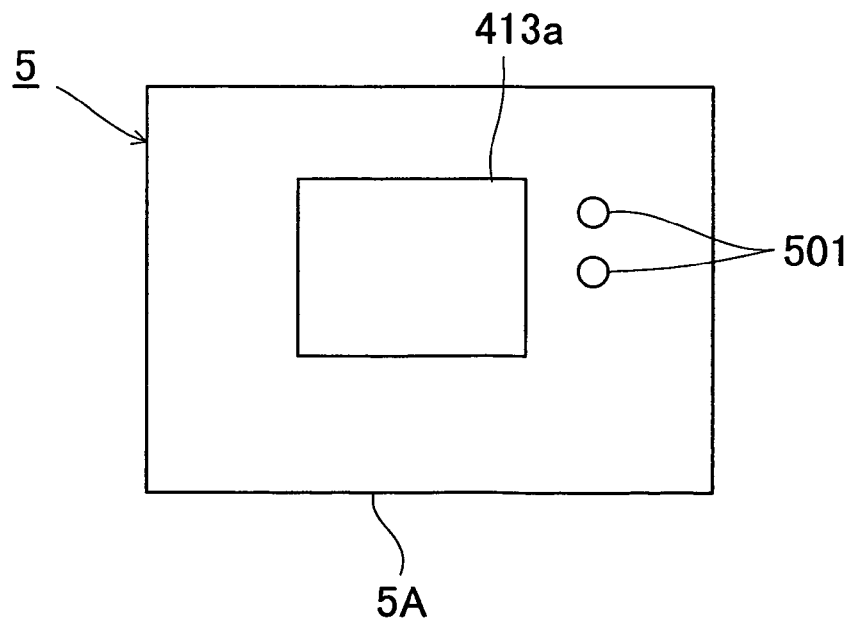
FIG. 2 Is a rear view of the digital camera.

FIG. 1 is a perspective view showing a digital camera according to a first embodiment of the present invention, and FIG. 2 is a rear view of the digital camera.

As shown in FIGS. 1 and 2, on the front face of the camera main body 5A of the digital camera 5, an image-taking lens 51 is provided. On the front upper portion thereof, a finder window 54, a distance measurement window 59, etc. are provided. In the camera main body 5A, an image pick-up element 403, which receives an optical image formed by the aforementioned image-taking lens 51 and performs a photoelectric conversion of the optical image, is disposed. In this embodiment, this image pick-up element 403 is comprised of a CMOS sensor that can read out pixel data in a nondestructive manner. Furthermore, on the upper surface of the camera main body 5A, a shutter button 53, image-taking mode keys 57, a liquid crystal panel 58, etc. are provided. At the side surface of the camera main body 5A, an insertion slit 56 into which a recording media 55 is removably inserted is provided.

The image-taking mode keys 57 are used for setting an exposure condition, such as an iris priority exposure and a shutter speed priority exposure, changing macro image-taking modes or setting a zoom condition while confirming the contents displayed on the liquid crystal display panel 58.

Furthermore, an LCD monitor 413a for a live-view display, image-processing mode setting keys 501, etc. are provided on the rear face of the camera main body 5A. A blur-compensation mode can be set up by the image-processing mode setting keys 501 while looking at the display of the LCD monitor 413a.

This digital camera 5 can record a picked-up image obtained by the image pick-up element 403 into the recording media 55 in the same way as conventional digital cameras, and has a function for performing a blur-detection during a main exposure for acquiring the picked-up image when a blur-compensation mode is set. However, the blur-compensation function may be set automatically without manually manipulating the image-processing mode setting keys. Furthermore, this digital camera 5 is designed such that a live-view display can be displayed on the LCD monitor 413a not only before a main exposure but also during the main exposure.

As will be explained later, the blur-detection and the live-view display during the main exposure are performed by specifying the addresses of plural thinned-out pixels among the pixels P (FIG. 3) of the CMOS sensor as the image pick-up element 403 and reading out the pixel data in a nondestructive manner.

Figure 3:
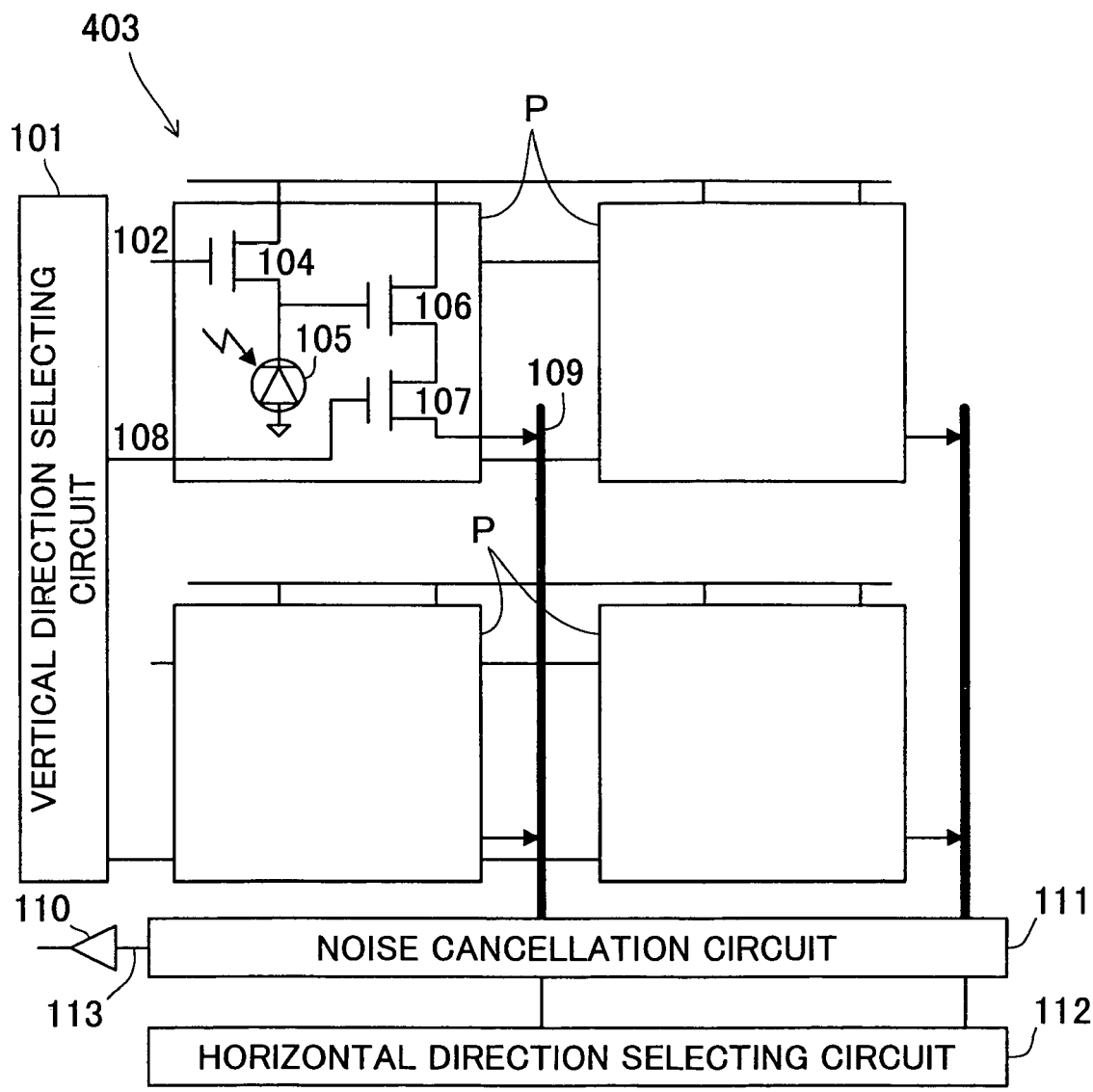
FIG. 3 is a block diagram showing a pixel structure of an image pick-up element of the digital camera.

FIG. 3 shows a pixel structure of the active pixel CMOS sensor constituting the image pick-up element 403. The image pick-up element 403 includes a number of pixels P arranged in the shape of a matrix as well known. In FIG. 3, for the purpose of simplicity, 2×2 pixels are illustrated.

In FIG. 3, one pixel P includes a photodiode 105 as a light-receiving element connected to a transistor 104 of a CMOS type constituting a reset switch, a transistor 106 for amplifying the pixel signal of the photodiode 105, a line-selection transistors 107 connected to the transistor 106 in series and controlled by a vertical direction selecting circuitry 101, etc. In FIG. 3, the reference numerals 102, 108, 109 and 110 denote a reset line, a line selecting address line, a signal line and an output amplifier on an output line 103, respectively. Furthermore, the reference numerals 111 and 112 denote a noise cancellation circuit and a horizontal direction selecting circuit for selecting a pixel row, respectively.

In this image pick-up element 403, by impressing a control signal to the horizontal direction selecting circuit 112 and the vertical direction selecting circuit 101 from outside, one or more pixels P can be specified, and the pixel data of the photodiode 105 of the specified pixel P is taken out through the output line 113 by way of the signal line 109, and is sent out as image data through the output amplifier 110. Thus, by specifying a desired pixel by the horizontal direction selecting circuit 112 and the vertical direction selecting circuit 101, it becomes possible to read out only the required pixel data at a high-speed period.

In a usual read-out (a destructive read-out) in this kind of image pick-up element 403, it is possible to cancel the fixed pattern noise (FPN) due to a scattering of the threshold or the like of the amplifying transistor 106 within the image pick-up element 403. Concretely, the noise cancellation processing can be performed by reading out the charges photoelectrically converted by and accumulated in the photodiode 105 and holding the charges in the noise cancellation circuit 111, subsequently reading out the charges again after the reset by the reset transistor 104 and holding the charges in the noise cancellation circuit 111, and then performing a subtraction of these two signals.

Furthermore, in this kind of image pick-up element 403, it is possible to perform a nondestructive read-out, i.e., to read out the accumulated pixel data photoelectrically converted by the photodiode without destroying the pixel data, because the read-out will be not performed in the reset state unlike the destructive read-out. This enables the read-out without loosing the accumulated charges in the photodiode 105 even during the exposure.

However, in the aforementioned nondestructive reading, since the reading in the reset state is not performed, noise cancellation processing cannot be performed within the image pick-up element 403. Therefore, in this embodiment, an implication output for one screen is stored in the memory as an FPN table. Then, the noise cancellation processing is performed by subtracting the corresponding implication output from the pixel data.

Figure 4:
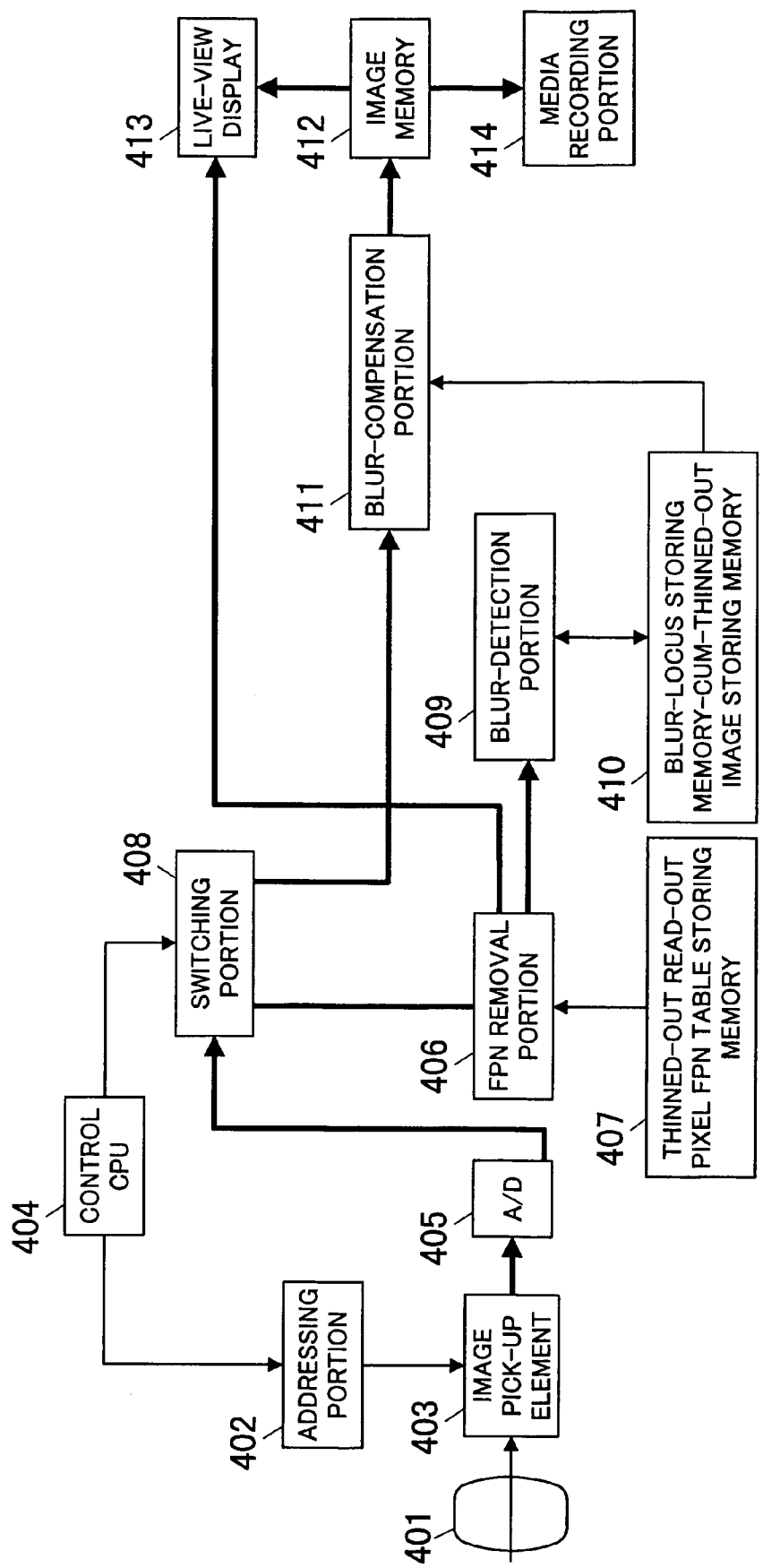
FIG. 4 is a block diagram showing an electric structure of the digital camera.

FIG. 4 shows a block diagram of the electric structure of the aforementioned digital camera 5.

This digital camera 5 is equipped with an addressing portion 402 which also serves as an image pick-up element driving portion, a control CPU 404 which controls the whole camera, an A/D converter 405 which converts an analog image signal into a digital image signal by the image pick-up element 403, a blur-detection portion 409 which detects a blur, a blur-compensation portion 411, an image memory 412, a live-view display 413, a media recording portion (driver) 414 corresponding to the recording media 55, etc. Also equipped to the digital camera 5 are an FPN removal portion 406, a thinned-out read-out pixel FPN table storing memory 407, a switching portion 408 that switches the sending out of the digital image data and a blur-locus storing memory-cum-thinned-out image storing memory 410.

Figure 5:
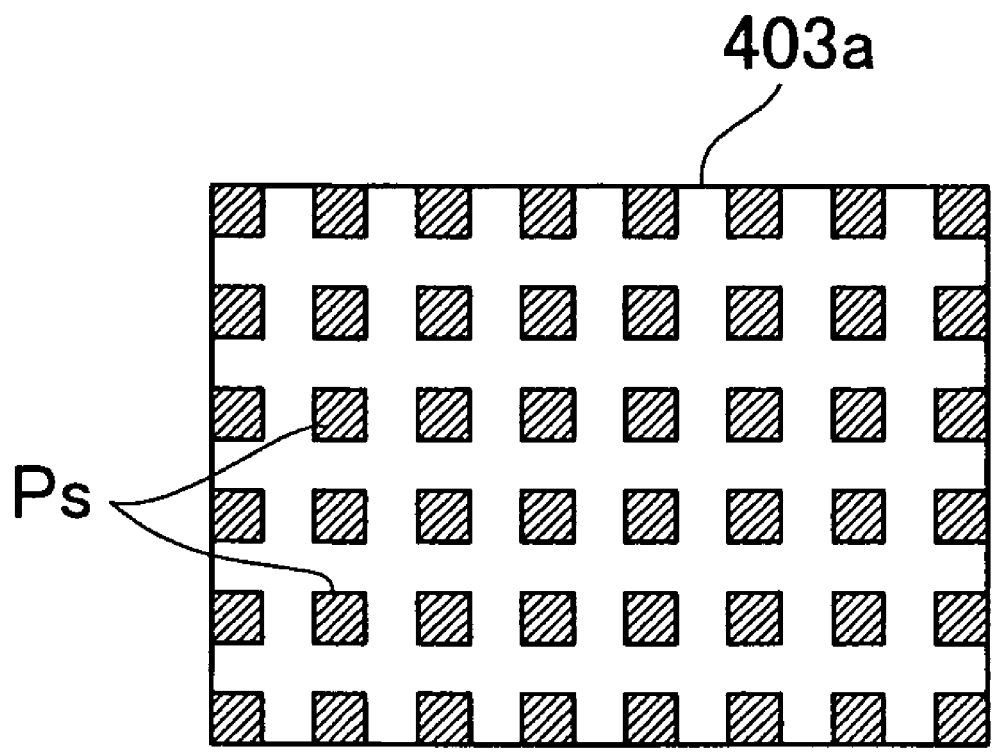
FIG. 5 is an explanatory view showing an example of a selection of plural specified pixels in the image pick-up element.

In order to perform a live-view display, etc., which will be mentioned later, the addressing portion 402 performs the addressing of pixel data as shown in FIG. 5 so that each pixel data of plural thinned-out specified pixels Ps among all of the pixels P constituting the light-receiving side 403a of the image pick-up element 403 can be read out in a destructive manner before the main exposure, and so that each pixel data of the plural specified pixels Ps can be read out in a nondestructive manner during the exposure.

The control CPU 404 controls the read-out of the pixel data of plural specified pixels Ps of the image pick-up element 403 through the addressing portion 402, and also controls the FPN removal portion 406, the thinned-out read-out pixel FPN table storing memory 407, the switching portion 408 and the blur-locus storing memory-cum-thinned-out image storing memory 410.

The FPN removal portion 406 has a function which eliminates the FPN that cancellation processing cannot be carried out within the image pick-up element 403 with reference to the data of the FPN table 407 only for a plurality of the specified pixels Ps when the pixel data is read out in a nondestructive manner from a plurality of the specified pixels. The thinned-out read-out pixel FPN table storing memory 407 stores the FPN data of the specified pixels in the FPN table.

The blur-detection portion 409 stores the pixel data obtained by reading out the plurality of specified pixels Ps in the blur-locus storing memory-cum-thinned-out image storing memory 410. As for the subsequent pixel data, the blur-detection portion 409 calculates the blur-locus by comparing the subsequent image data with the previous image data, and then stores the calculated results in the blur-locus storing memory-cum-thinned-out image storing memory 410.

The blur-compensation portion 411 has a function which rectifies a hand-blur by using the blur-locus stored in the blur-locus storing memory-cum-thinned-out image storing memory 410.

The live-view display 413 displays a live-view display by processing the pixel data obtained by the destructive readout before the main exposure and the pixel data obtained by the nondestructive read-out during the main exposure. The live-view display 413 has the liquid crystal display monitor 413a.

Next, the operation of the digital camera 5 shown in FIGS. 1 to 3 will be explained with reference to FIGS. 4 to 6.

A photographic object image is received by the image pick-up element 403 through the optical system 401 including the image-taking lens 51, and then photoelectrically converted every each pixel P depending on a light-receiving amount.

(1) Before the Main Exposure

Figure 6:
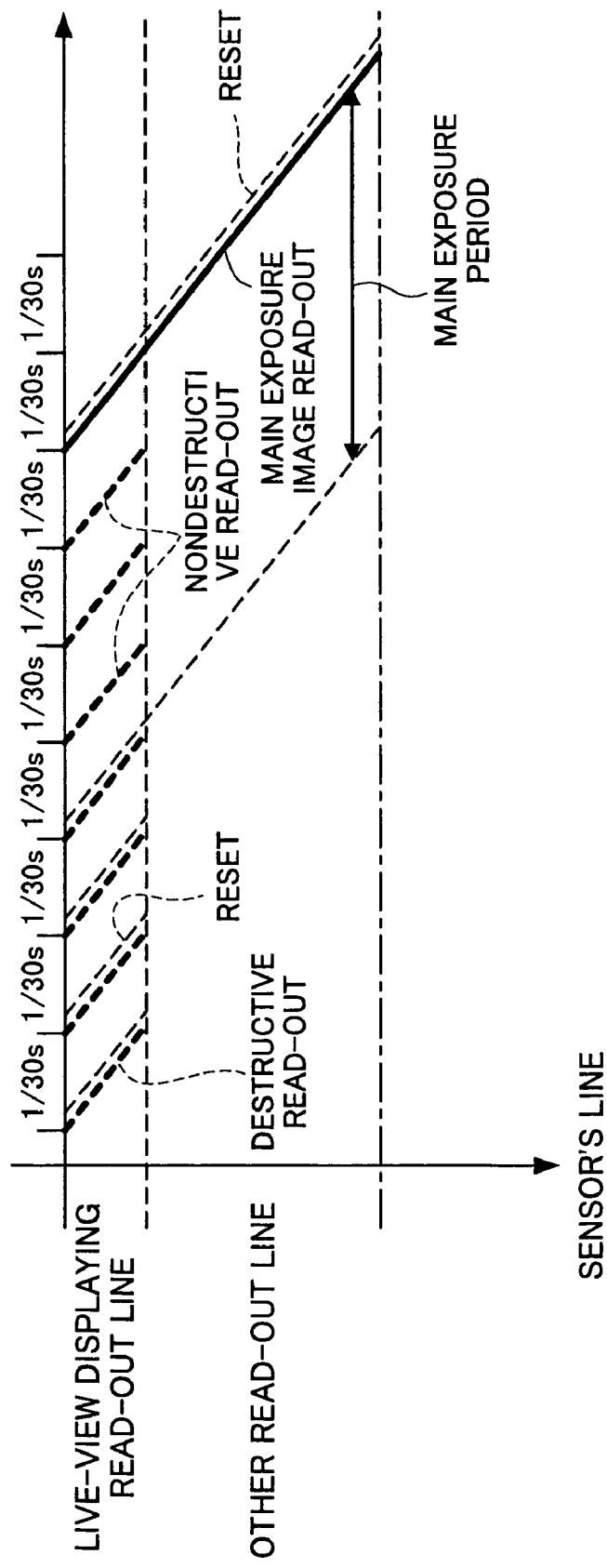
FIG. 6 is an explanatory drawing showing a read-out timing of a pixel signal of the image pick-up element.

As shown in FIG. 6, the control CPU 404 controls the addressing portion 402 such that the read-out of the pixel data of the plurality of specified pixels Ps of the image pick-up element 403 and the reset thereof, i.e., the destructive read-out, are performed at a predetermined period (for example, 1/30 seconds), and also controls the switching section 408 such that the pixel data read out in a destructive manner is sent to the FPN removal section 406.

The pixel data read out in a destructive manner is converted into digital pixel data by the A/D-conversion circuit 405, and the digital pixel data is sent to the FPN removal portion 406 through the switching portion 408.

As mentioned above, the pixel data read out in a destructive manner has been subjected to the cancellation processing of the FPN within the image pick-up element 403. Therefore, the pixel data sent to this FPN removal portion 406 is sent out to the live-view display 413 and the blur-detection portion 409 as it is without being processed in the FPN removal portion 406.

The live-view display 413 processes the sent pixel data as required for the live-view display, and performs the live-view display on the LCD monitor 413a. Since the pixel data is read from the plurality of specified pixels Ps at this time, even if the total number of the pixels P of the image pick-up element 403 is large, it is possible to read out the pixel data at a high-speed period, enabling a smooth image change display, for example, in every 30 seconds.

The pixel data of the first sheet obtained by the destructive read-out of the plurality of specified pixels Ps in the blur-detection portion 409 is stored/saved as it is in the blur-locus storing memory-cum-thinned-out image storing memory 410. As for the subsequent pixel data obtained by the destructive read-out, the blur-locus is calculated by using the pixel data obtained by the previous destructive read-out. Both the pixel data obtained by the destructive read-out and the calculated blur-locus is stored/saved in the blur-locus storing memory-cum-thinned-out image storing memory 410.

Thus, the pixel data obtained by the destructive read-out for a plurality of sheets and the blur-locus data will be saved in the blur-locus storing memory-cum-thinned-out image storing memory 410.

The aforementioned plurality sheets mean the specified number of sheets required for the blur-locus operation. If the number exceeds the specified number, the pixel data obtained by the oldest destructive read-out will be destroyed, and only the newest pixel data will be saved.

(2) During the main exposure period

When the release button 53 is pressed, as shown in FIG. 6, all of the pixels P will be reset one by one, and the main exposure will start. The main exposure period is set longer than the changing period (1/30 seconds) of the live-view. Since a blur hardly occurs when the main exposure period is 1/30 seconds or less, it is not necessary to perform a nondestructive read-out during the main exposure. It is apparent that a nondestructive read-out for the live-view every 1/30 seconds is not required.

The control CPU 404 controls the addressing portion 402 so that the pixel data of the plurality of specified pixels can be read out in a nondestructive manner in order to perform a live-view display at the aforementioned period even in the main exposure period, and further controls the switching portion 408 so that the pixel data read out in a nondestructive manner can be sent to the FPN removal portion 406.

The pixel data read out in a nondestructive manner will be converted into digital pixel data by the A/D conversion circuit 405, and the digitalized pixel data is sent to the FPN removal portion 406 through the switching portion 408.

As mentioned above, in cases where the nondestructive read-out is performed, the cancellation processing of the FPN cannot be performed within the image pick-up element 403. Therefore, in the FPN removal portion 406, the corresponding noise data of the pixels in the thinned-out read-out image FPN table is subtracted from the obtained pixel data to perform the cancellation processing of the FPN.

The pixel data from which the FPN is eliminated is sent to the live-view display 413 and the blur-detection portion 409. The live-view display 413 processes the sent pixel data as required for a live-view display and displays the live-view.

As mentioned above, since a plurality of pixels Ps are specified and the pixel data is read out in a nondestructive manner even during the main exposure, it is possible to process the pixel data at a high-speed period. Further, since the pixel data will be updated whenever the pixel data is read out, a live-view at a real time can be obtained.

In the blur-detection portion 409, the pixel data of the first sheet obtained by the nondestructive read-out of the plurality of specified pixels Ps will be stored/saved as it is in the blur-locus storing memory-cum-thinned-out image storing memory 410. As for the subsequent pixel data obtained by the nondestructive read-out, the blur-locus is calculated by using the pixel data obtained by the previous nondestructive read-out. Both the pixel data obtained by the nondestructive read-out and the calculated blur-locus are stored/saved in the blur-locus storing memory-cum-thinned-out image storing memory 410.

Thus, the pixel data obtained by the nondestructive read-out for a plurality of sheets and the blur-locus data are saved in the blur-locus storing memory-cum-thinned-out image storing memory 410.

The aforementioned plurality of sheets mean the specified number of sheets required for the blur-locus operation. If the number exceeds the specified number, the oldest pixel data obtained by the nondestructive read-out is destroyed, and only the newest pixel data is saved.

As mentioned above, since a continuous blur-detection that lasts from before the exposure till during the exposure is performed, the prediction error of blur becomes small. In other words, the blur-detection precision will be high and the blur-compensation can be performed exactly.

(3) Main Exposure Period End

After the main exposure period terminates, in order to perform the destructive read-out of the pixel data of all of the pixels, the control CPU 404 controls the addressing portion 402 so that the pixel data in the plurality of specified pixels Ps is read out in a destructive manner and thereafter the pixel data of the remaining pixels P is read out in a destructive manner. Furthermore, the control CPU 404 controls the switching portion 408 such that only the pixel data of the plurality of specified pixel data is processed by the blur-detection portion 409 and that the pixel data of all of the pixels P is processed by the blur-compensation portion 411.

Since the pixel data of the plurality of specified pixels Ps is first read when a destructive read-out of the pixel data of all of the pixels P is performed, it is easily realizable to selectively send out the pixel data of a plurality of specified pixels Ps from the pixel data of all of the pixels P obtained by the destructive read-out.

The pixel data of all of the pixels P obtained by the destructive read-out is converted into digital pixel data by the A/D conversion circuit 405, and the digitalized pixel data is sent to the FPN removal portion 406 through the switching portion 408.

Since the pixel data sent to the FPN removal portion 406 is obtained by the destructive read-out, it is not required to perform the FPN removal processing and can be sent out to the live-view display 413 and the blur-detection portion 409 as it is.

In the blur-detection portion 409, a blur-locus is calculated by using the pixel data obtained by the last nondestructive read-out. Both the pixel data obtained by the destructive read-out and the calculated blur-locus data are stored/saved in the blur-locus storing memory-cum-thinned-out image storing memory 410.

In the blur-compensation portion 411, the data of all of the pixels obtained by the destructive read-out is subjected to a blur-restoration processing by using the blur-locus data stored in the blur-locus storing memory-cum-thinned-out image storing memory 410 from before the main exposure till the termination of the main exposure period. Then, the restored pixel data is sent to the image memory 412 to be saved as a picked-up image.

The image saved in this image memory 412 can be displayed on the LCD monitor 413a of the live-view display 413, or can be recorded in the recording media 55 provided in the media recording portion 414 in accordance with the operation by a user.

Next, the second embodiment according to the present invention will be explained.

The digital camera according to the second embodiment of the present invention has the same appearance as the digital camera according to the first embodiment shown in FIGS. 1 and 2. In other words, the digital camera 5 is equipped with an image-taking lens 51, a finder window 54, a distance measurement window 59, a shutter button 53, image-taking mode keys 57, a liquid crystal panel 58, an insertion slit 56 into which a recording media 55 can be removably inserted, an LCD monitor 413a, image-processing mode setting keys 501, etc. Since the function of each of these portions is the same as that of the digital camera according to the first embodiment, the explanation will be omitted.

Furthermore, in the camera main body 5A, an image pick-up element 203 which receives an optical image formed by the image pick-up lens 51 and photoelectrically converts the optical image is provided. In this embodiment, the image pick-up element 203 consists of a CMOS sensor which can perform a nondestructive read-out of pixel data in the same manner as in the image pick-up element of the digital camera according to the first embodiment.

This digital camera 1 can record the picked-up image obtained by the image pick-up element 203 in the recording media 213 in the same manner as in a conventional digital camera, and has a blur-compensation function which will be executed when the blur-compensation mode is setup. Of course, the digital camera may be constituted such that the blur-compensation function will be automatically performed without setting the blur-compensation mode.

The aforementioned blur-compensation function performs the blur-compensation by performing the blur-detection utilizing the nondestructive read-out of the pixel data of the pixels P of the CMOS sensor and the address read-out to the Pixels P with a CMOS sensor as the image pick-up element 203.

The structure of the image pick-up element 203 is the same as that shown in FIG. 3.

Figure 7:
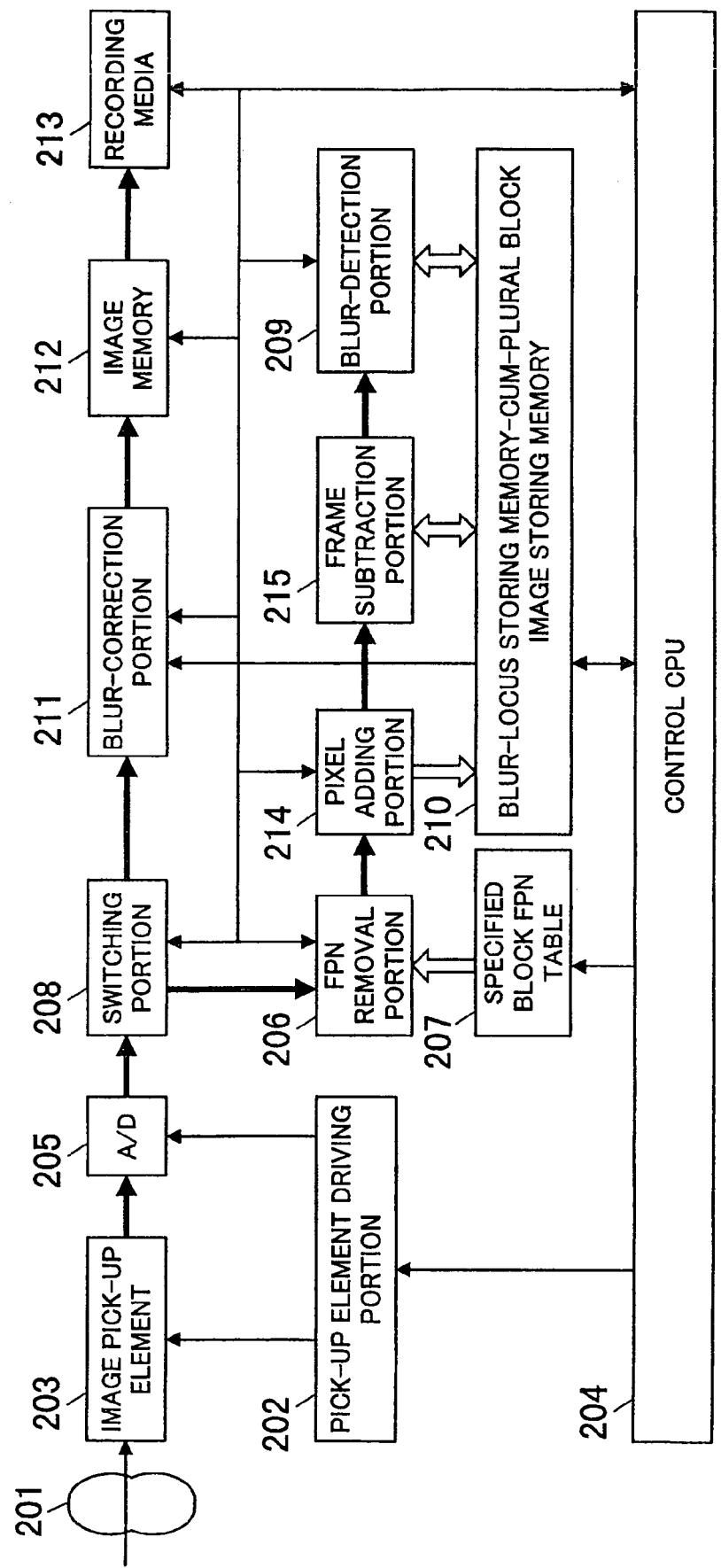
FIG. 7 is a block diagram showing an electric structure of a digital camera according to a second embodiment of the present invention.

FIG. 7 is a block diagram showing the electric structure of the digital camera 1 according to the second embodiment.

This digital camera 1 is provided with an image pick-up element driving portion 202, a control CPU 204 which controls the whole camera, an A/D converter 205 which converts an analog image signal into a digital image signal by the image pick-up element 203, a blur-detection portion 209 which detects a blur and a blur-compensation portion 211, an image memory 212, a recording media 213, etc. Furthermore, this digital camera 1 is equipped with an FPN removal portion 206, an FPN table 207 corresponding to a specified block Q, a switching portion 208 that switches the sending destination of the digital image data, a blur-locus storing memory-cum-plural block image storing memory 210, a pixel adding portion 214 and a frame subtraction portion 215.

For a blur-detection which will be mentioned later, the image pick-up element driving portion 202 specifies the addresses of the pixels contained in the plurality of specified small area blocks Q (FIG. 8) among all of the pixels constituting the light-receiving side 203a of the image pick-up element 203 during an exposure so that these data can be read out in a nondestructive manner, and also specifies the addresses of all of the pixels P of the image pick-up element 203 so that these data can be read out in a destructive manner when the exposure is terminated.

The control CPU 204 controls the read-out of the pixel data of the image pick-up element 203 through the image pick-up element driving portion 202, and also controls the FPN removal portion 206, the FPN table 207 and also a blur-locus storing memory-cum-plural block image storing memory 210.

Figure 8:
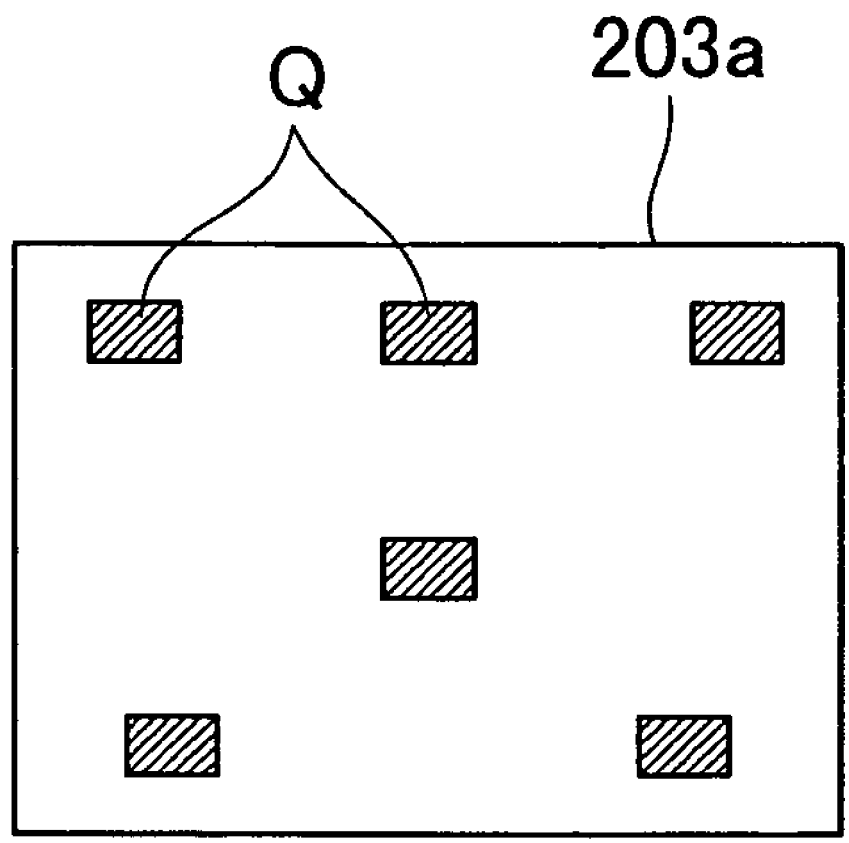
FIG. 8 is an explanatory drawing showing a small area specified block of the image pick-up element.

For the blur-detection, the aforementioned each specified block Q comprises any areas selected from all of the pixels P of the image pick-up element 203, as shown in FIG. 8.

The time for reading out only the illustrated specified blocks Q becomes much shorter than that for reading out all of the pixels. For example, assuming that all of the 1,200,000 pixels are read out in 100 ms and each block Q includes 200×250=50,000 pixels, the time required for reading out all of the pixel signals of the six specified blocks Q (a total of 300,000 pixels) Q will be ¼ of the time required for reading out all of the pixels, i.e., 25 ms. This shows that the blur-detection can be performed in the period of 25 ms.

If it is required to perform the blur-detection in a quicker period, what is necessary is to make the size of the specified block Q smaller, or to decrease the number of the specified block Q. On the contrary, if it is allowed to perform the blur-detection in a slower period, what is necessary is to enlarge the size of specified block Q, or to increase the number of specified blocks Q.

The FPN removal portion 206 has a function that eliminates the FPN which cannot be processed within the image pick-up element 203 with reference to the data of the FPN table 207 corresponding to each specified block Q, in cases where it is switched by the switching portion 208 and pixel data is read out from the specified block Q in a nondestructive manner during an exposure.

The pixel adding portion 214 adds the pixel data of a plurality of pixels contained in each specified block Q so that the added data become a signal level required for the blur-detection. Furthermore, the frame subtraction portion 215 subtracts the previously added pixel data from the present added pixel data to obtain the data of this time.

The blur-locus storing memory-cum-plural image storing memory 210 stores the previously added pixel data and the frame data of this time subtracted by the frame subtraction portion 215.

In the blur-detection portion 209, the blur-locus is calculated using the sent frame data of this time and the previous frame data stored in the blur-locus storing memory-cum-plural image storing memory 210.

Next, the operation of the digital camera 1 having the aforementioned structure will be explained with reference to FIGS. 7–9. In the following explanation, the fundamental control of the camera, such as a lens driving, an iris-diaphragm driving, an LCD driving and a flash driving, will be omitted since these are well known.

First, a photographic object image is received by the image pick-up element 203 through the optical system 201 including the image-taking lens 51, and photoelectrically converted by the image pick-up element 203 depending on the light-receiving amount of each pixel P.

When the shutter button 53 is pressed, all of the pixels P are reset and an exposure is started. During the exposure, the control CPU 204 controls the image pick-up element driving portion 202 so that the nondestructive read-out of the pixel data of the pixels contained in the plurality of specified block Q among the pixels P in the image pick-up element 203 is performed, and also controls the switching portion 208 so that the obtained image data is sent to the FPN removal portion 206.

Figure 9:
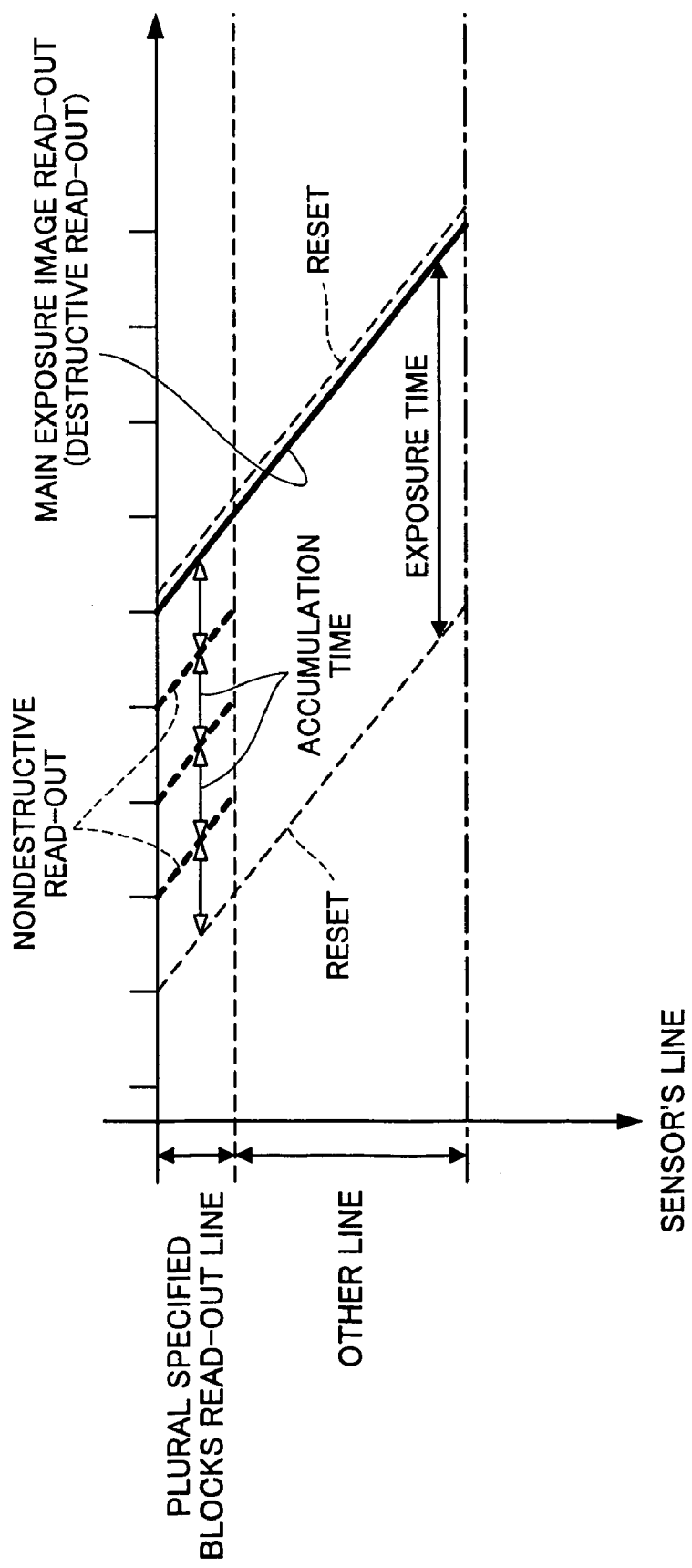
FIG. 9 is an explanatory drawing showing a read-out timing of a pixel signal of the image pick-up element.
Figure 10:
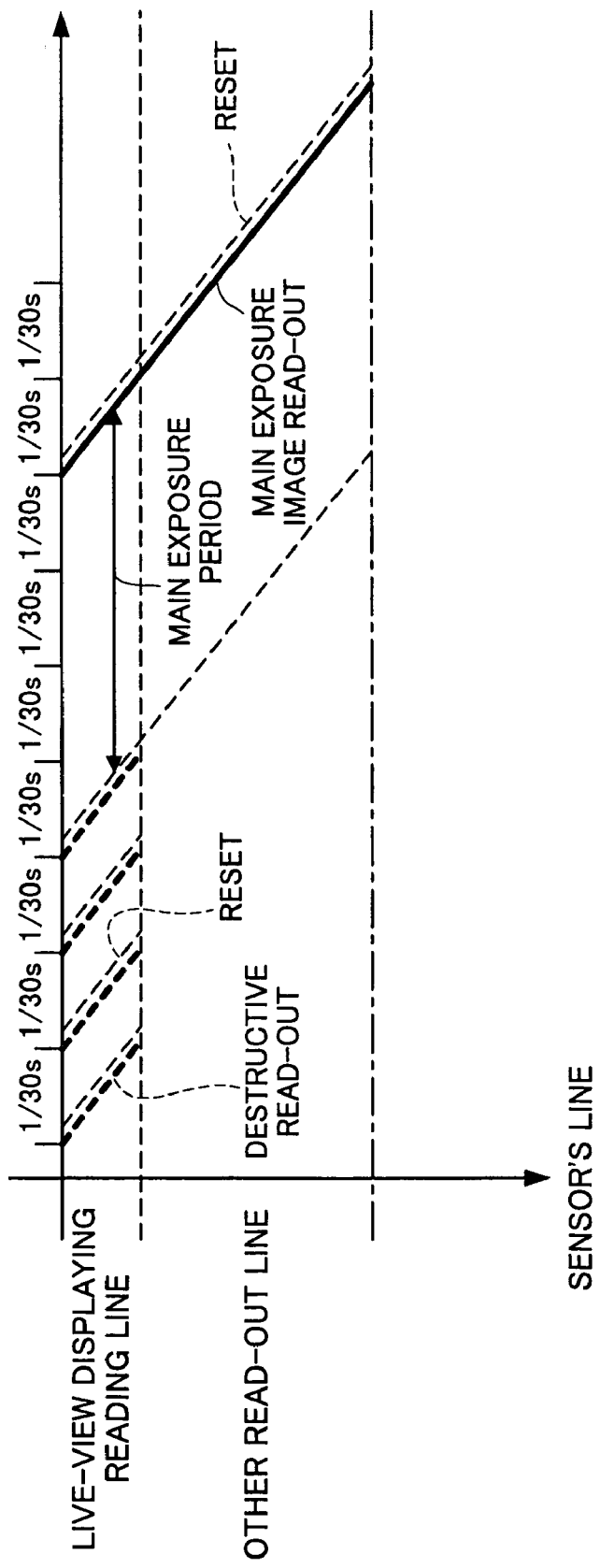
FIG. 10 is an explanatory drawing showing the relationship between a reset of a pixel signal and an image read-out timing in a conventional digital camera.

The read-out timing of the pixel signal of the image pick-up element 203 is shown in FIG. 9. In FIG. 9, the vertical axis shows the line direction of the image pick-up element 203, and the horizontal axis shows a time.

The exposure time is from the initial reset (the start of the exposure) to the last destructive read-out (the end of the exposure). In the illustrated example, the nondestructive read-out is performed three times only to the plurality of specified blocks Q during the exposure period. In this case, in order to make the storage time of each line of the specified block Q become equal, the reset at the time of the exposure start is performed one by one from the line with the specified block Q which performs the nondestructive read-out. With this, after the termination of the exposure, the read-out order of all of the pixels is performed in sequence from the line in which the specified block Q exists.

Furthermore, although the nondestructive read-out of the pixel data of each specified block Q is performed during the exposure, what is required for a blur-detection is the pixel signal accumulated from the read-out to the subsequent read-out. That is, as shown in FIG. 9 showing the storage time for a blur-detection, the initial storage time is from the reset to the first nondestructive read-out, and the last storage time is from the last nondestructive read-out to all pixel read-out, and the intermediate storage time is from a nondestructive read-out from the subsequent nondestructive read-out. This can be obtained by subtracting the previously read-out pixel data from the currently read-out pixel data.

In the example shown in FIG. 9, although the nondestructive read-out is performed for the specified block three times during the exposure, the number of times for the nondestructive read-out is not limited to this.

Returning to FIG. 7, the pixel signal obtained by the nondestructive read-out performed by the image pick-up element 203 is converted into digital pixel data by the A/D converter 205, and sent to the FPN removal portion 206 through the switching portion 208.

In the FPN removal portion 206, the noise cancellation processing is performed by subtracting the corresponding noise data stored in the FPN table 207 from the sent pixel data. The pixel data that the noise cancellation processing was performed is sent to the pixel adding portion 214.

The memory space required for the table 207 of the FPN removal can be small as compared with the case having an FPN table for all of the pixels. For example, as mentioned above, in the case of 200×250=50,000 pixels, the memory space will be one fourth. Furthermore, since the pixel data obtained by the nondestructive read-out is subjected to the noise cancellation processing by the aforementioned FPN removal portion 206, the blur-detection can be performed with high precision.

In the pixel adding portion 214, the pixel data corresponding to the pixel P is added every specified block Q, and the added pixel data will be sent to the frame subtraction portion 215 and also to the blur-locus storing memory-cum-plural image storing memory 210 for storing the added image data.

In the aforementioned pixel adding portion 214, for example, the block may be divided into blocks of 2×2=4 pixels, the pixel data corresponding to each of these 4 pixels P may be added to obtain the 1-pixel image data for the blur-detection. By this, an underexposure due to a high-speed period read-out will be corrected to become the same level as the image data level during the main exposure. Thus, a sufficient blur-detection level can be secured. Of course, the number of pixels to be added and the division method of the block Q are not limited to the above, and can be arbitrarily set, provided that a signal required for a blur-detection is obtained.

In the frame subtraction portion 215, the frame data of this time is obtained by subtracting the previously added pixel data from the pixel data to which addition processing was performed. The obtained frame data of this time is sent to the blur-detection portion 209 and also to the blur-locus storing memory-cum-plural image storing memory 210, and stored therein.

In the blur-detection portion 209, the blur-locus is calculated from the sent frame data of this time and the previous frame data stored in the blur-locus storing memory-cum-plural image storing memory 210. The calculated blur-locus is stored in the blur-locus storing memory-cum-plural image storing memory 210.

After the exposure is completed, the control CPU 204 controls the image pick-up element driving portion 202 so that the destructive read-out of all of the pixels P of the image pickup element 203 is performed, and also controls the switching portion 208 so as to send the pixel data to the blur-compensation portion 211.

The pixel data obtained by the destructive read-out of all of the pixels P in the image pick-up element 203 is converted into digital data by the A/D converter 205, and sent to the blur-compensation portion 211 through the switching portion 208.

In the blur-compensation portion 211, the image data obtained by the aforementioned destructive read-out is subjected to the blur-compensation processing and/or the blur-restoration processing using the blurring locus data from the blur-locus storing memory-cum-plural image storing memory 210. Then, the image data after the blurring compensation and/or the blurring restoration is sent to the image memory 212, and then stored in the recording media 213.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims.

What is claimed is:

1. A digital camera, comprising:
   an image pick-up element which can read out pixel data in a nondestructive manner;
   specifying means for specifying addresses of a plurality of pixels thinned out among all pixels of said image pick-up element;
   data read-out means for reading out pixel data of said specified plurality of pixels in a destructive manner before a main exposure and pixel data of said specified plurality of pixels in a nondestructive manner during said main exposure; and
   a detector which performs a blur-detection by using said pixel data read out in said destructive manner before said main exposure and said pixel data read out in said nondestructive manner during said main exposure.

2. The digital camera as recited in claim 1, further comprising a display which displays a live-view image by using said pixel data read out in said destructive manner before said main exposure and said pixel data read out in said nondestructive manner during said main exposure.

3. A pixel data read-out control apparatus, the apparatus comprising:
   specifying means for specifying a plurality of pixels thinned out among all pixels of an image pick-up element which can read out pixel data in a nondestructive manner;
   read-out means for reading out pixel data of said specified pixels in a destructive manner before a main exposure and pixel data of said specified pixels in a nondestructive manner during said main exposure; and
   a detector which performs a blur-detection by using said pixel data read out in said destructive manner before said main exposure and said pixel data read out in said nondestructive manner during said main exposure.

4. The pixel data read-out control apparatus as recited in claim 3, further comprising a display which displays a live-view image by using said pixel data read out in said destructive manner before said main exposure and said pixel data read out in said nondestructive manner during said main exposure.

5. A pixel data read-out control method, the method comprising:
   specifying a plurality of pixels thinned out among all pixels of an image pick-up element which can read out pixel data in a nondestructive manner;
   reading out pixel data of said specified pixels in a destructive manner before a main exposure and said pixel data in a nondestructive manner during said main exposure; and
   performing a blur-detection by using said pixel data read out in said destructive manner before said main exposure and said pixel data read out in said nondestructive manner during said main exposure.

6. The pixel data read-out control method as recited in claim 5, further comprising:
   displaying a live-view image by using said pixel data read out in said destructive manner before said main exposure and said pixel data read out in said nondestructive manner during said main exposure.

7. A digital camera, comprising:
   an image pick-up element which can read out pixel data in a nondestructive manner;

specifying means for specifying pixels contained in a block of small area among all pixels of said image pick-up element;

read-out means for reading out data of pixels contained in said block of small area in said nondestructive manner during said exposure;

a memory which stores a fixed pattern noise table concerning said pixels contained in said block;

fixed pattern noise elimination means for performing noise cancellation processing to said pixel data of said block obtained by reading out in said nondestructive manner with reference to said fixed pattern noise table;

an adder which adds pixel data from which said fixed pattern noise is eliminated to said pixels contained in said block; and a detector which detects a blur using said added pixel data.

8. The digital camera as recited in claim 7, wherein said specifying means specifies pixels contained in a plurality of blocks of small area among all pixels of said image pick-up element during an exposure, wherein said read-out means reads out data of pixels contained in said plurality of blocks in said nondestructive manner during said exposure, wherein said memory stores a fixed pattern noise table concerning said pixels contained in said plurality of blocks, wherein said fixed pattern noise elimination means performs noise cancellation processing to said pixel data of said plurality of blocks obtained by reading out in said nondestructive manner with reference to said fixed pattern noise table, and wherein said adder adds pixel data from which said fixed pattern noise is eliminated to said pixels contained in said plurality of blocks.

9. A blur-detection apparatus, comprising:
read-out means for reading out data of pixels in a nondestructive manner during an exposure, said pixels being contained in a block of small area among all pixels of an image pick-up element which can read out pixel data in a nondestructive manner;

fixed pattern noise elimination means for performing noise cancellation processing to pixel data of said block obtained by reading out in a nondestructive manner with reference to a table of a fixed pattern noise corresponding to pixels contained in said block;

an adder which adds pixel data from which said fixed pattern noise is eliminated to said pixels contained in said block; and a detector for detecting a blur by using said added pixel data.

10. The blur-detection apparatus as recited in claim 9, wherein said read-out means reads out data of pixels in a nondestructive manner during an exposure, said pixels being contained in a plurality of blocks of small area among all pixels of an image pick-up element which can read out pixel data in a nondestructive manner, wherein said fixed pattern noise elimination means performs noise cancellation processing to pixel data of said plurality of blocks obtained by reading out in a nondestructive manner with reference to a table of a fixed pattern noise corresponding to pixels contained in said plurality of blocks, and wherein said adder adds pixel data from which said fixed pattern noise is eliminated to said pixels contained in said plurality of blocks.

11. A blur-detection method, comprising:
a step for reading out data of pixels in a nondestructive manner during an exposure, said pixels being contained in a block of small area among all pixels of an image pick-up element which can read out pixel data in a nondestructive manner;

a step for performing noise cancellation processing to pixel data of said block obtained by reading out in a nondestructive manner with reference to a table of a fixed pattern noise corresponding to pixels contained in said block;

a step for adding pixel data from which said fixed pattern noise is eliminated to said pixels contained in said block; and a step for detecting a blur by using said added pixel data.

12. The blur-detection method as recited in claim 11, wherein processing defined in each of said steps is subjected to pixel data contained in a plurality of blocks.

* * * * *